United States Patent
Janson

(10) Patent No.: US 6,663,526 B2
(45) Date of Patent: Dec. 16, 2003

(54) TRANSMISSION ISOLATION ASSEMBLY

(75) Inventor: David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 09/683,493

(22) Filed: Jan. 8, 2002

(65) Prior Publication Data

US 2003/0130082 A1 Jul. 10, 2003

(51) Int. Cl.[7] .......................... F16H 47/00; F16D 3/12; F16D 3/14; F16F 15/10
(52) U.S. Cl. .......................... 475/92; 74/574; 192/212; 464/62
(58) Field of Search .......................... 475/317, 92, 114, 475/116; 74/574; 192/212, 55.6, 212.2; 464/62

(56) References Cited

U.S. PATENT DOCUMENTS

| | | | |
|---|---|---|---|
| 1,362,048 A | * 12/1920 | Shepard | 464/62 |
| 2,196,716 A | * 4/1940 | Williams | 464/62 |
| 3,485,063 A | * 12/1969 | Behlmer | 464/62 |
| 3,996,767 A | * 12/1976 | Geislinger | 464/82 |
| 4,464,822 A | * 8/1984 | Pfeifer | 29/436 |
| 4,690,256 A | 9/1987 | Bopp et al. | 192/21 |
| 4,782,932 A | 11/1988 | Janson | 192/70.17 |
| 4,782,936 A | 11/1988 | Bopp | 192/106.2 |
| 4,962,838 A | 10/1990 | Clancey | 192/106.1 |
| 4,987,987 A | 1/1991 | Damon et al. | 192/106.1 |
| 5,083,980 A | 1/1992 | Focoueur, Hervëet al. | 464/24 |
| 5,104,356 A | 4/1992 | Paquin et al. | 464/60 |
| 5,105,680 A | 4/1992 | Naudin | 74/574 |
| 5,218,884 A | 6/1993 | Röhrle | 74/574 |
| 5,219,431 A | 6/1993 | Stretch | 267/261 |
| 5,234,377 A | 8/1993 | Stretch et al. | 464/77 |
| 5,364,308 A | * 11/1994 | Vollet | 464/82 |
| 5,385,018 A | * 1/1995 | Kohno et al. | 60/338 |
| 5,496,216 A | 3/1996 | Röhrle et al. | 464/66 |
| 5,603,660 A | 2/1997 | Kyle | 464/68 |
| 5,762,557 A | * 6/1998 | Chazot et al. | 464/62 |
| 5,788,043 A | * 8/1998 | Feigler et al. | 192/214 |
| 6,176,362 B1 | 1/2001 | Arhab | 192/213.1 |
| 6,299,541 B1 | * 10/2001 | Bertin et al. | 464/68 |
| 6,471,616 B2 | * 10/2002 | Stevenson | 475/296 |

FOREIGN PATENT DOCUMENTS

DE       3641962 C1 * 7/1988      ............. F16D/3/50

* cited by examiner

Primary Examiner—Tisha D Lewis

(57) ABSTRACT

An isolation assembly (26) for transferring torque between an engine (20) and a planetary transmission (30) includes both a radial spring assembly (56) and a viscous fluid damper (58). A damper plate (76) is rotationally coupled to the engine (20) and to the radial spring assembly (56). The damper plate (76) is also coupled to the viscous fluid damper (58). The torque output from the damper (58) and radial spring assembly (56) is then coupled to the input to the transmission (30).

14 Claims, 4 Drawing Sheets

TRANSMISSION ISOLATION ASSEMBLY

BACKGROUND OF INVENTION

The present invention relates to vehicle drivelines coupled to engines, and more particularly to drivelines including a planetary gear transmission and a damper assembly coupled to an engine.

Vehicle transmissions have typically been one of two types. There are manual transmissions, which, while more fuel efficient, require significant effort by the operator. They also generally allow more engine noise and vibration created by the engine to transfer through to the transmission and other driveline components, which is generally undesirable to the vehicle occupants. Some have tried to reduce the transmission of vibrations and noise by employing a dual mass flywheel, connected to the engine output, in which the two masses are connected by a radial spring assembly and a friction damper. But, while improving the vibration and noise transmission somewhat, it is limited in the range of transient vibrations that it can handle. Generally, the spring/friction damper assembly can only be tuned for a limited range of engine events. For example, if tuned for damping torque spikes from the engine, then it does not damp sufficiently for single firing impulses from the engine. Moreover, these systems are still coupled to a manual transmission, with all of its inconveniences.

On the other hand, there are automatic transmissions, which, while they are very convenient for the operator of the vehicle, are less fuel efficient. One of the reasons that the automatic transmissions are less efficient is that they employ a torque converter to transfer the torque output from the engine to the input of the transmission. The torque converter allows the vehicle to stop and start while in gear without stalling the engine. It also provides the added benefit of isolating the engine pulsations from the transmission, thus providing for a smoother operating drivetrain with less noise. Even if the torque converter includes a lock-up clutch for higher speed operation, the lock up clutch typically has some type of basic damper on it to provide isolation of the noise and vibrations transmitted from the engine although it does not need to be particularly good at damping over broad ranges since the converter locks up under only limited conditions. The torque converter, in particular, damps noise and vibrations during transients in the torque, such as lug limits at low RPMs, accelerator pedal tip-in, shifting between gears, and initial start-up of the vehicle.

With today's ever increasing desires for improved fuel economy in vehicles, however, the inefficiencies inherent in a torque converter driven automatic transmission are undesirable. So, automatic transmission systems (i.e., typical planetary gear sets) are being developed where the torque converter is eliminated. In its place, a wet clutch, or other mechanism, is employed to allow for both vehicle start up and also the vehicle remaining stopped while the automatic transmission is in gear. This type of transmission is sometimes referred to as a powershift transmission. Thus, the automatic transmission operates with the convenience that vehicle operators prefer while improving fuel economy.

But the secondary benefit that the torque converter provided, namely isolation of the engine pulsations from the automatic transmission, is now eliminated.

Thus, it is desirable to have a powershift transmission that provides the improved fuel economy of a drivetrain that operates without a torque converter, yet still provides isolation of the transmission from the noise and vibrations, of various types, of the engine. Further, it is desirable that the isolation assembly is small and light weight to maximize the fuel efficiency and packaging gains achieved from removing a torque converter.

SUMMARY OF INVENTION

In its embodiments, the present invention contemplates an isolation assembly for use with an engine and a planetary transmission. The isolation assembly includes an input assembly adapted to be rotationally coupled to the engine, and an output assembly adapted to be rotationally coupled to the transmission and adjacent the input assembly to form a cavity therebetween. A plurality of generally radially oriented spring assemblies have a first radially inner end coupled to one of the input assembly and the output assembly, and a second radially outer end coupled to the other of the input assembly and the output assembly. Also, the isolation assembly includes a viscous damper having a viscous fluid within the cavity.

The present invention further contemplates a method of providing vibrational torque isolation between and engine, having an output member with a torque applied from the engine, and a planetary gear set transmission, having an input member, the method comprising the steps of: coupling the engine output member to an input element of a radial spring assembly; transferring torque through the radial spring assembly; coupling an output of the radial spring assembly to the transmission input member; coupling the engine output member to an input of a viscous fluid damper assembly; transferring torque through the viscous fluid damper assembly; and coupling an output of the viscous fluid damper assembly to the transmission input member.

Accordingly, an object of the present invention is to provide isolation between an engine and an automatic transmission, in a vehicle driveline that does not employ a torque converter.

Another object of the present invention is to provide an isolation assembly with a low spring rate, long travel springs and a viscous damper as a single, compact, light weight, unit.

An advantage of the present invention is that a vehicle's fuel efficiency can be improved without transmitting unwanted noise and vibration to vehicle occupants.

Another advantage of the present invention is that long travel, low spring rate springs will allow for effective torque transfer while minimizing noise and vibration transferred through an isolation assembly.

A further advantage of the present invention is that a viscous fluid damper in the isolation assembly will allow for rate dependent damping, thereby reducing transmission of noise and vibration over a wide range of frequencies.

DETAILED DESCRIPTION

Figure 1:
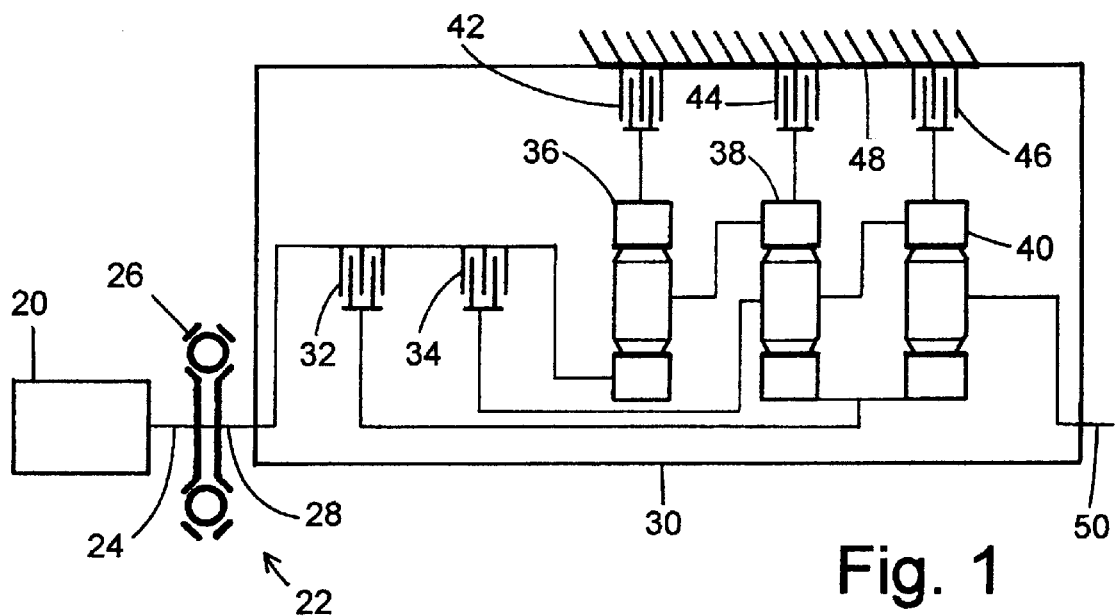
FIG. 1 is a schematic view of an engine and portion of a vehicle driveline in accordance with the present invention.

FIG. 1 shows a schematic diagram of an engine 20 and a portion of a vehicle driveline 22. The engine 20 includes a crankshaft assembly 24 extending therefrom, which is rotationally connected to an isolation assembly 26. The isolation assembly 26, in turn, is rotationally connected to an input shaft 28 of a planetary geartrain transmission 30. The transmission 30 is very similar to that of a conventional automatic transmission found in vehicles. The transmission 30 includes a first clutch 32 and a second clutch 34 that can be selectively engaged with the input shaft 28. The two clutches 32, 34 are engaged with portions of first 36, second 38 and third 40 planetary gear sets. The first 36, second 38 and third 40 planetary gear sets are engaged with a first 42, a second 44, and a third 46 friction band, respectively. Each of the friction bands 42, 44, 46 can be selectively grounded to the housing 48 of the transmission 30. A portion of the third gear set 40 is rotationally connected to a transmission output shaft 50, which connects to the remaining portion of a conventional drive train (not shown).

By observing the assembly of FIG. 1, one will note that the engine 20 will drive the planetary transmission 30, but without a torque converter attached between the crankshaft 24 and the transmission input shaft 28. By eliminating a torque converter, one eliminates the power loss inherent in the operation of a torque converter.

The clutches 32, 34 are preferably wet friction clutches (but may also be some other type of suitable clutch mechanism) to allow an automatic transmission driven vehicle to start-up from a stop, and remain stopped while in gear, without a torque converter.

Figure 2:
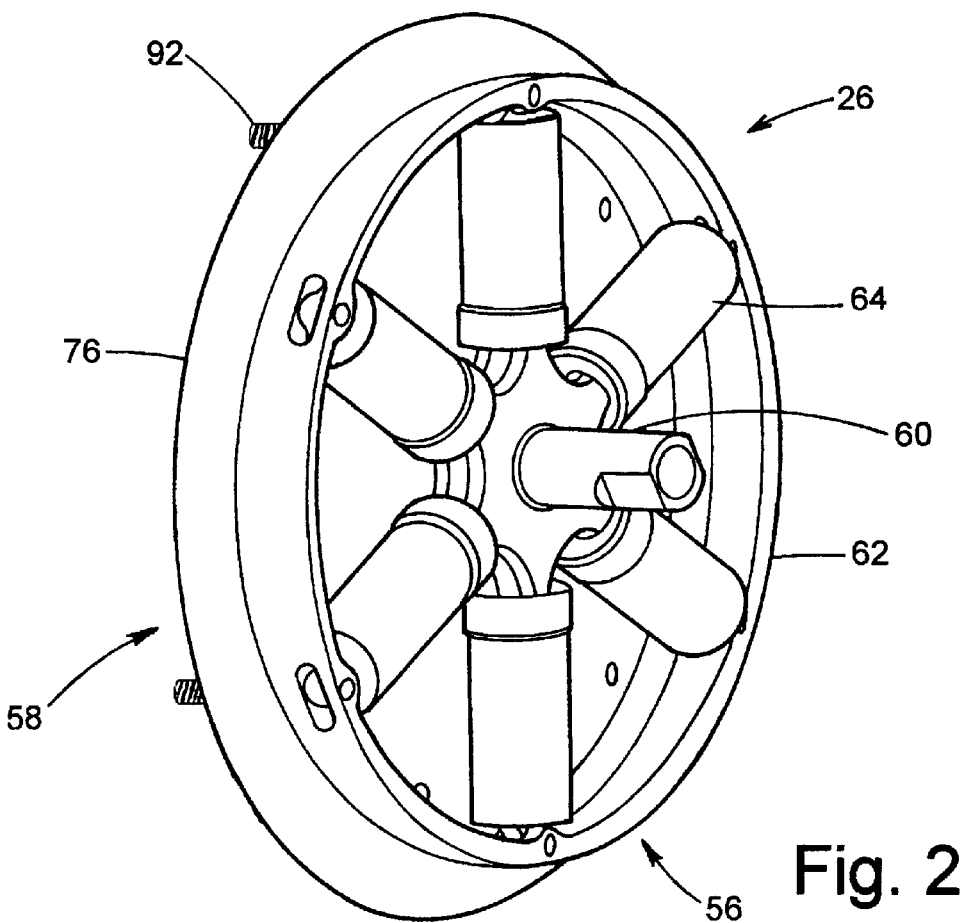
FIG. 2 is a perspective view of the isolation assembly in accordance with the present invention.
Figure 3:
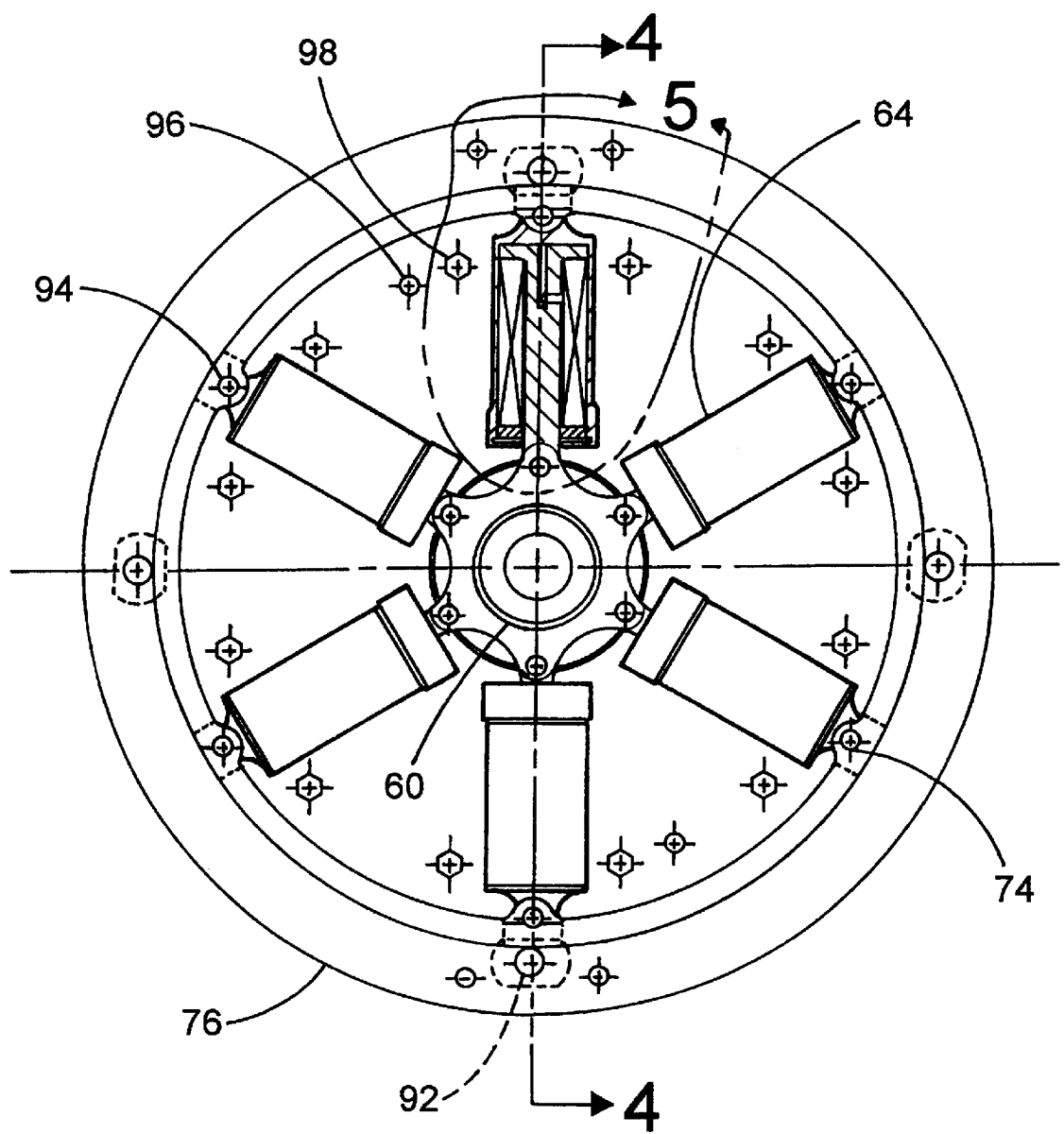
FIG. 3 is a is a front elevation of the isolation assembly of FIG. 2, on an enlarged scale.
Figure 4:
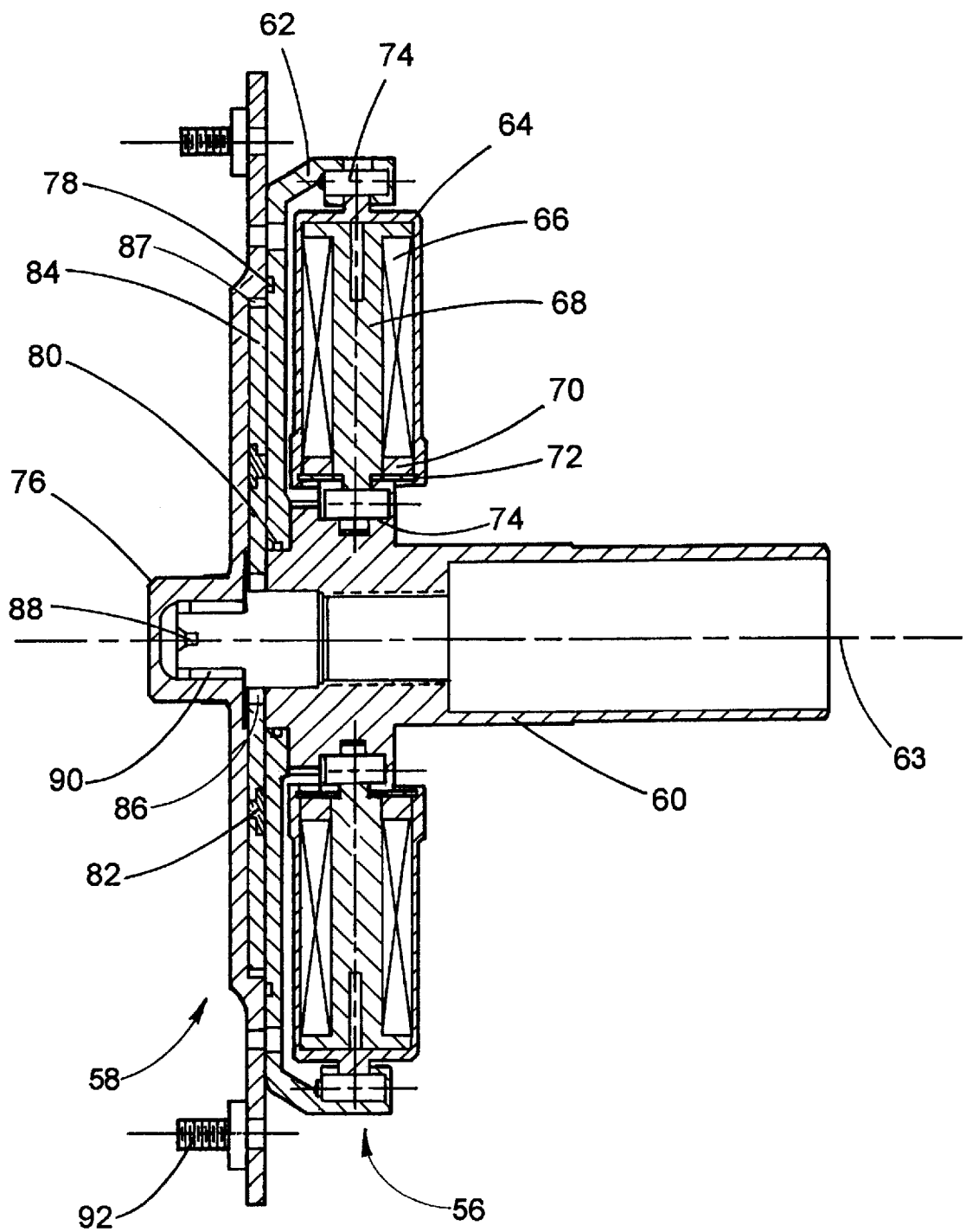
FIG. 4 is a sectional view, on an enlarged scale, taken along line 4-4 in FIG. 3.

FIGS. 2–4 show a more detailed view of the isolation assembly 26. The isolation assembly 26 includes a combined radial spring assembly 56 in parallel with a viscous shear fluid damper 58, all in one, compact, light weight assembly.

The isolation assembly 26 includes a hub 60, which is rotationally coupled to the transmission input shaft 28 (shown in FIG. 1). A damper cover 62 is mounted to the hub 60, so that the two can rotate, about the same axis 63 of rotation, relative to one another. An outer flange of the damper cover 62 is shaped to form six spring box pivot pin retainers 94, and is fastened, via six spring box pivot pins 74, to six spring box housings 64. Each spring box housing 64 is shaped to form a hollow, cylindrical portion on its inner surface. Within each spring box housing 64 is mounted a spring box plunger 68, that is biased into the housing 64 via a respective coil spring 66. Each spring 66 is held in its housing by a spring box cap 70 and corresponding spring box cap retainer 72. Also, the radially inner end of each spring box plunger 68 is fastened, via a spring box pivot pin 74, to the hub 60. The coupling of the damper cover 62 to the hub 60, via the spring box housings 64, springs 66 and spring box plungers 68, essentially forms the radial spring assembly 56 of the isolation assembly 26.

The hub 60 extends past the damper cover 62 to form a hub pilot 88, and engages a damper plate 76, via a hub pilot bushing 90. The damper plate 76 can rotate relative to the hub 60 about the axis 63. The damper plate 76 extends radially outward, initially spaced from the damper cover 62 to form a fluid cavity 86, and then steps toward the damper cover 62 to make sealing contact with the damper cover 62.

A series of damper cover bolts 98, damper cover pins 96, and an outer damper cover seal 78 assure a fluid tight seal between the two components, while allowing for a limited amount of rotational play between the two. An inner damper cover seal 80, seals between the hub 60 and damper cover 62 to assure that the fluid cavity 86 does not leak.

A flat, circular shear plate 84 is mounted in the cavity 86. Mounted in the shear plate 84 are a series of plate centering buttons 82. The thickness of the plate 84 and centering buttons 82 are very precisely controlled so that the buttons 82 extend above the plate surface, on either side, about five one thousandths of an inch (approximately 0.13 millimeters). In this way, when assembled, the buttons 82 are in contact with the surfaces of the damper cover 62 and damper plate 76, but there is a gap on either side of the shear plate 84 of about five thousandths of an inch. A viscous shear fluid 87 fills this gap and the remaining portions of the cavity 86. This fluid can be silicone fluid, or any other suitable viscous fluid. The thickness of the gaps can be somewhat larger or smaller depending upon various factors, including the type of fluid, amount of torque to be transferred, diameter of the shear plate 84, etc. For example, the gaps may be on the order of three one thousandths of an inch, or as large as ten one thousandths of an inch.

The damper plate 76 also includes four drive studs 92, which engage with the crankshaft assembly 24 (shown in FIG. 1).

The operation of the system will now be described, as illustrated in FIGS. 1–6. The engine 20 drives the crankshaft 24, which drives the damper plate 76 via the drive studs 96. The rotation of the damper plate 76 drives the damper cover 62, which offsets the outer end of the radial spring assembly 56 in the direction of rotational acceleration, which compresses the springs 66. The torsion is then transferred to the hub 60 through the spring assemblies 56. The radial spring assemblies 56 provide long travel (allowing for a relatively lower spring rate), relatively low friction (providing for better isolation), and a passive system for transferring the torque. It is desirable to avoid the friction because this defeats the purpose of providing the isolation in the first place. The isolation is particularly important at lower engine RPMs, where it is undesirable to have body boom and other noise and vibrations transmitted to the vehicle from the engine.

In parallel to this torque transfer via the radial spring assembly 56, is the torque transfer via the viscous fluid damper 58. As the damper plate 76 and damper cover 62 rotate, the angular displacement shears the fluid 87 in the cavity 86 between the surface of the damper cover 62 and the shear plate 84, and between the shear plate 84 and the damper plate 76. Thus, the torque is transferred from the damper plate 76 to the hub 60, while the shearing of the fluid damps out the unwanted transients. The hub 60 then transfers torque to the transmission input shaft 28.

Since the damping mechanism employs viscous damping, which is a rate dependent damping, this allows for good damping over a broader range of frequencies than typical friction damping. Thus, the viscous fluid damper 58 is effective for damping both the small transients of single firing events and the large transients due to accelerator tip-in and vehicle start-up.

Consequently, the single isolation assembly 26, by having a radial spring assembly 56 in parallel with a viscous shear fluid damper 58, provides efficient transfer of torque at the same time that multiple types of transients in the engine 20 are effectively isolated from the transmission 30. Further, the isolation assembly 26 is a completely passive device that requires no monitoring or computer controls to operate effectively.

Figure 5:
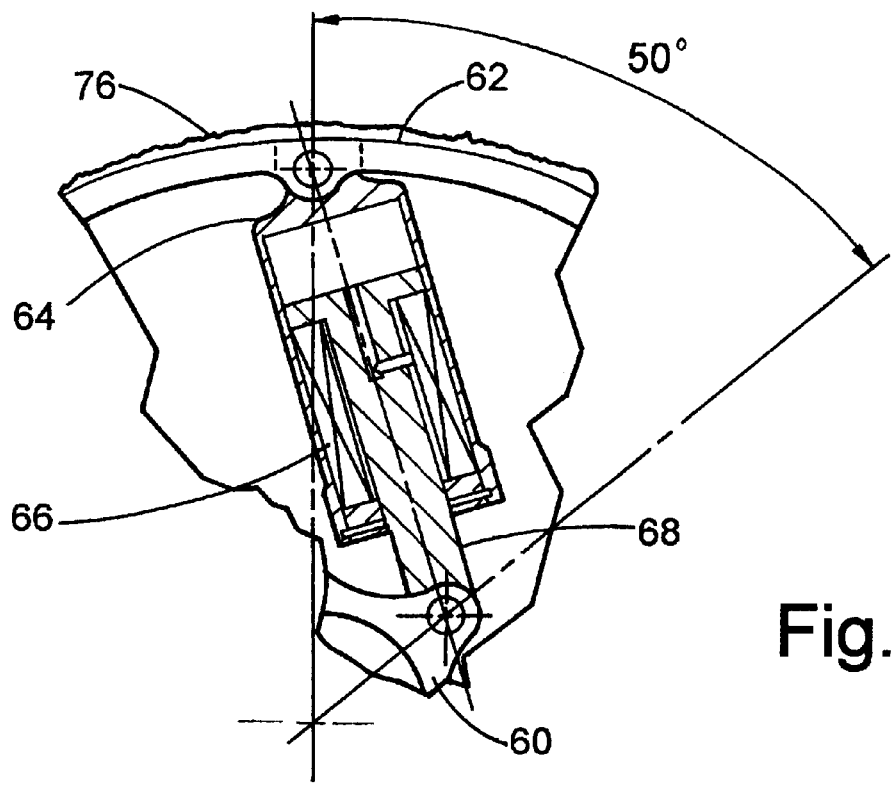
FIG. 5 is a view taken from encircled area 5 in FIG. 3, on an enlarged scale, illustrating a fifty degree deflection of the isolation assembly.

To better illustrate the isolation assembly 26, the deflection due to a positive torque transient will now be discussed, (as is illustrated in FIG. 5). The damper plate 76 and damper cover 62 receive input torque from the crankshaft assembly 24, and rotate counterclockwise (as is illustrated in FIG. 5 for a 50 degree deflection) relative to the hub 60. This causes the spring box plungers 68 to pull partially out of the spring box housings 64, thus compressing the springs 66. Torque is transferred via the spring box housings 64, springs 66 (which are now compressed and extending in a direction other than radially), and spring plungers 68, to the hub 60 to increase its counterclockwise rotational velocity. The viscous fluid damper 58 portion of the isolation assembly 26 also transfers torque as described above.

Figure 6:
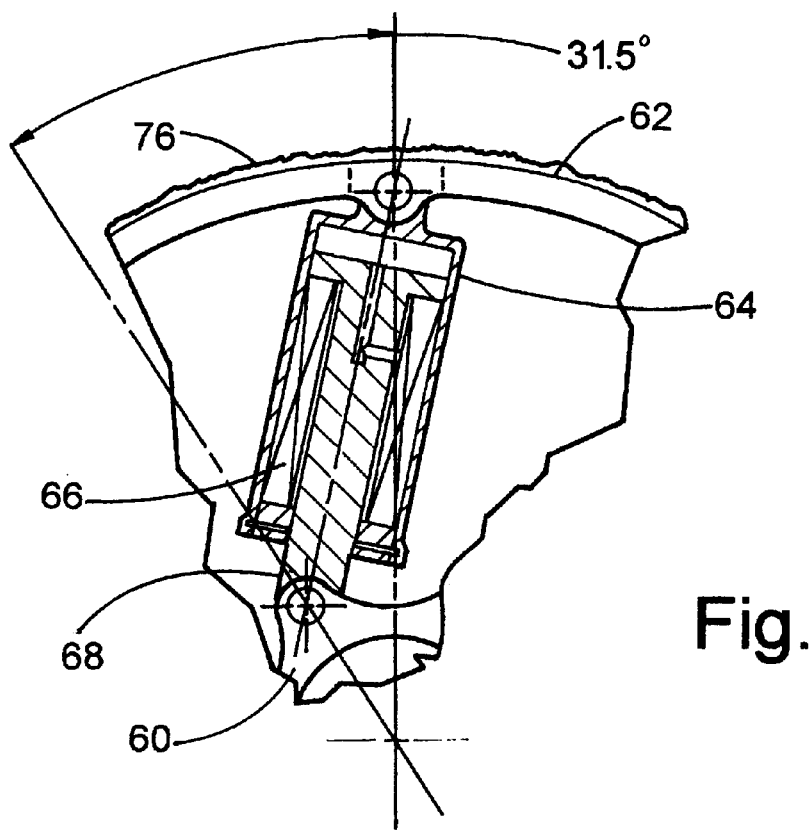
FIG. 6 is a is a view similar to FIG. 5, on an enlarged scale, illustrating a 31.5 degree torque reversal deflection of the isolation assembly.

The deflection due to a negative torque transient (torque reversal transient) will now be discussed, (as illustrated in FIG. 6). The damper plate 76 and damper cover 62 receive the input torque from the crankshaft assembly 24, but at a significantly reduced level from what it had immediately been receiving (causing a relative clockwise rotation as viewed in FIG. 6 for a 31.5 degree deflection). So the damper cover 62 rotates clockwise relative to the hub 60. Again, this causes the spring box plungers 68 to pull partially out of the spring box housings 64, thus compressing the springs 66. Torque is transferred via the spring box housings 64, springs 66 (which are now compressed and extending in a direction other than radially), and spring plungers 68 to the damper cover 62 to decrease its counterclockwise rotational velocity. Again, the viscous fluid damper 58 portion of the isolation assembly 26 also transfers torque as described above.

While certain embodiments of the present invention have been described in detail, those familiar with the art to which this invention relates will recognize various alternative designs and embodiments for practicing the invention as defined by the following claims.

What is claimed is:

1. An isolation assembly for use with an engine and a planetary transmission, the isolation assembly comprising:
    an input assembly adapted to be rotationally coupled to the engine;
    an output assembly adapted to be rotationally coupled to the transmission and adjacent the input assembly to form a cavity therebetween;
    a plurality of generally radially oriented spring assemblies having a first radially inner end coupled to one of the input assembly and the output assembly, and a second radially outer end coupled to the other of the input assembly and the output assembly; and
    a viscous damper including a viscous fluid within the cavity, and a plate, having a front side and a back side, mounted within the cavity, forming first and second subcavities within the main cavity adjacent to the front side and the back side respectively.

2. The isolation assembly of claim 1 wherein the first and the second subcavities are each between three and ten thousandths of an inch thick.

3. The isolation assembly of claim 1 wherein the radial spring assemblies include helical springs.

4. The isolation assembly of claim 1 wherein the viscous fluid is a silicone fluid.

5. An isolation assembly for use with an engine and a planetary transmission, the isolation assembly comprising:
    an input assembly adapted to be rotationally coupled to the engine;
    an output assembly adapted to be rotationally coupled to the transmission and adjacent to the input assembly to form a cavity therebetween, and including a generally cylindrical hub member, adapted to rotationally couple to the transmission, and a damper cover mounted on and extending radially from the hub, with the damper cover rotatable relative to the hub;
    a plurality of generally radially oriented spring assemblies having a first radially inner end coupled to one of the input assembly and the output assembly, and
    a second radially outer end coupled to the other of the input assembly and the output assembly; and a viscous damper including a viscous fluid within the cavity.

6. The isolation assembly of claim 5 wherein the input assembly includes the damper cover and a damper member, with the damper member mounted on and extending radially from the hub, and with the damper member rotatable relative to the hub.

7. The isolation assembly of claim 6 wherein the spring assemblies are mounted between the hub and the damper cover.

8. The isolation assembly of claim 7 wherein the cavity is formed between the damper cover and the damper member.

9. The isolation assembly of claim 8 further including a plate mounted in the cavity.

10. The isolation assembly of claim 5 wherein the cavity is formed between the damper cover and the damper member.

11. A vehicle driveline that is coupled to an engine, the driveline comprising:
    a planetary transmission having an input member and an output member, with a plurality of planetary gear sets coupled therebetween; and
    an isolation assembly including an input assembly adapted to be rotationally coupled to the engine; an output assembly adapted to be rotationally coupled to the transmission and adjacent to the input assembly to form a cavity therebetween, and including a generally cylindrical hub member, adapted to rotationally couple to the transmission, and a damper cover mounted on and extending radially from the hub, with the damper cover rotatable relative to the hub; a plurality of generally radially oriented spring assemblies having a first radially inner end coupled to one of the input assembly and the output assembly, and a second radially outer end coupled to the other of the input assembly and the output assembly; and a viscous damper including a viscous fluid within the cavity.

12. The vehicle driveline of claim 11 wherein the input assembly includes the damper cover and a damper member, with the damper member mounted on and extending radially from the hub, and with the damper member rotatable relative to the hub, and wherein the spring assemblies are mounted between the hub and the damper cover.

13. The vehicle driveline of claim 12 wherein the cavity is formed between the damper cover and the damper member, and wherein the vehicle driveline further includes a plate mounted in the cavity.

14. The vehicle driveline of claim 13 wherein the viscous fluid is a silicone fluid.

* * * * *